No. 735,461. PATENTED AUG. 4, 1903.
C. A. BUTLER.
STEAMER.
APPLICATION FILED AUG. 1, 1902.
NO MODEL.
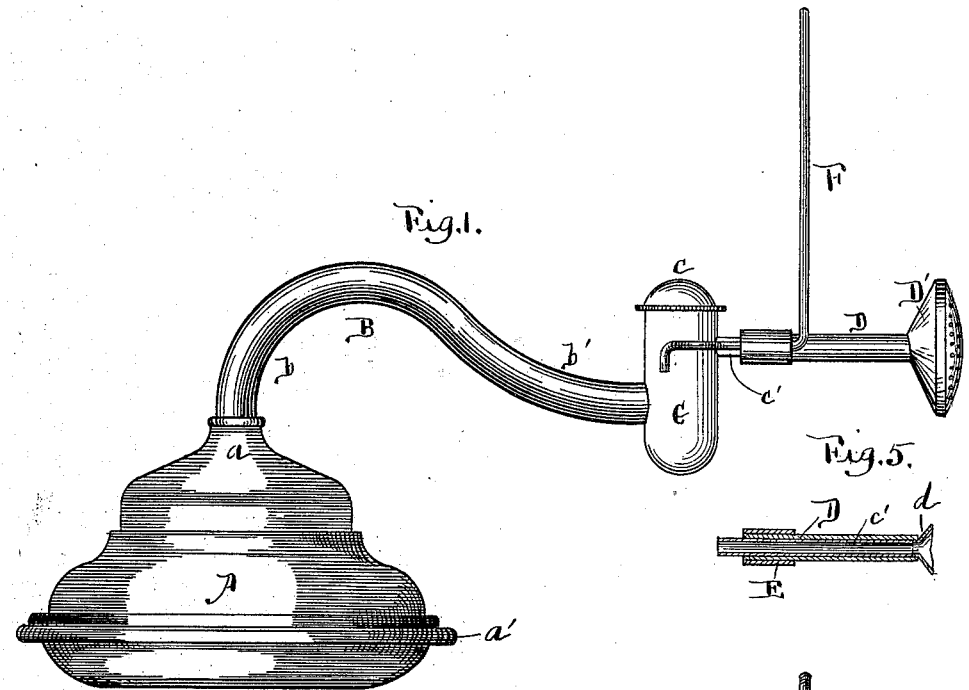
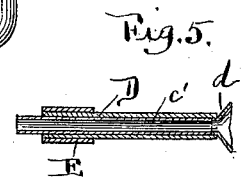
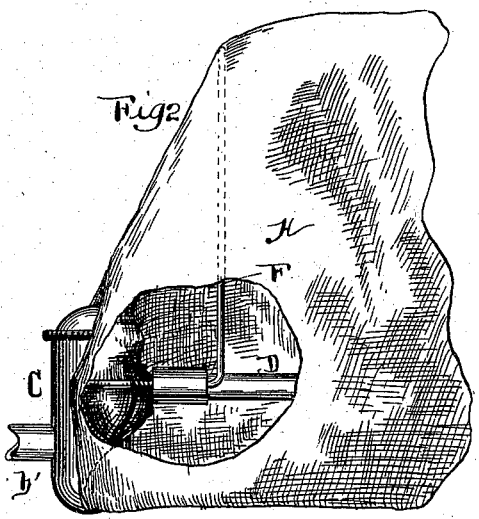
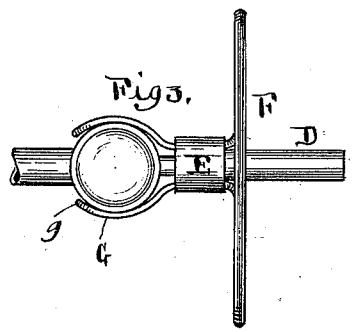
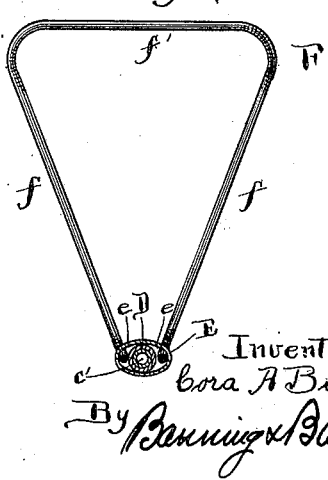

No. 735,461. Patented August 4, 1903.

UNITED STATES PATENT OFFICE.

CORA A. BUTLER, OF CHICAGO, ILLINOIS.

STEAMER.

SPECIFICATION forming part of Letters Patent No. 735,461, dated August 4, 1903.

Application filed August 1, 1902. Serial No. 117,915. (No model.)

*To all whom it may concern:*

Be it known that I, CORA A. BUTLER, a citizen of the United States, residing at Chicago, in the county of Cook, State of Illinois, have invented a certain new and useful Improvement in Steamers, of which the following is a specification.

This invention relates to that class of devices which have for their object the discharge and distribution of medicated steam or vapor for the purpose of improving the health of the skin and for the cure of diseases affecting the membranes of the mouth and nose, and is especially designed to purify and beautify the complexion by removing from the skin foreign substances and strengthening and invigorating it by the action of the medicated steam thereon.

The invention more particularly relates to the means by which the steam is medicated and distributed over the face or other portion of the body to be treated; and the invention further consists in the features of construction and combination of parts hereinafter described and claimed.

In the drawings illustrating the invention, Figure 1 is a side elevation of the apparatus; Fig. 2, a view of the receptacle for the medicinal substances, showing the screen or canopy for retaining the steam and the means by which it is supported; Fig. 3, a top or plan view of the aforesaid receptacle with the adjoining parts in position for supporting the steam-retaining screen or canopy; Fig. 4, a cross-sectional view taken on line 4 4 of Fig. 3, and Fig. 5 a longitudinal sectional view of the steam-discharge pipe and the supporting-tube to which the rose is attached.

The steam is generated in a tank or kettle A, which may be of any desired shape, but is preferably made to have a tapering top or discharge end *a* and with a circumferential flange or ring *a'* for the support of the kettle over a gas-stove or other suitable heating device. Into the mouth of the discharge end is screw-threaded or otherwise attached a gooseneck B, having an upwardly-turned section *b* and a downwardly-turned section *b'*, although it is plain that the steam-conveying pipe may be of other shape than the one herein described. To the outer end of the gooseneck is attached the receptacle C, provided with a cap or cover *c*, screw-threaded thereon or otherwise removably secured thereto for the purpose of retaining therein preparations used in the treatment of the skin or membrane to which the steam after medication is to be applied. Outwardly extending from and entering the receptacle at a point above the point at which the gooseneck enters the receptacle is a steam-discharge pipe *c'* of a length sufficient to provide for the secure support of the parts to be inserted thereon. Slidably mounted upon the steam-discharge pipe is a supporting-tube D, having attached thereto at its outer end a rose D', whose converging side walls unite in a short mouth *d*, brazed or otherwise fixedly secured to the inner wall of the carrying-tube at its outer or free end, thereby forming an abutment or shoulder for the contact of the outer end of the steam-discharge pipe when the carrying-tube has been forced back into place thereon. A horizontally-elongated ring or collar E surrounds the carrying-tube at its inner end and contacts with the top and bottom thereof, leaving spaces *e* on each side of the carrying-tube between the outer wall thereof and the sides of the elongated ring or collar.

A screen or canopy supporting rack F, having, as shown, upwardly-diverging side arms *f* and a top or cross bar *f'*, preferably of continuous formation, has its side arms bent or turned at the point of their greatest convergence to extend back through the spaces *e* between the ring or collar and the supporting-tube extending therethrough, and these backward extensions of the rack are fixedly attached between the collar and the supporting-tube, thereby serving to more firmly unite one to the other. Formed integral with the extensions of the arms of the rack are the fingers G, turned or rounded to conform to some extent with the curvature of the receptacle and having their ends *g* downwardly turned to furnish an obtuse or rounded surface for contact with the receptacle when the clasping-fingers are sprung into place thereon. A screen or canopy H, of a size sufficient to cover the head and shoulders of the person using the steamer, has one of its edges slipped down over the steam-discharge pipe, so as to straddle it, and the carrying-tube is then slipped back onto the steam-discharge pipe until the clasping-fingers are sprung back, forcing the screen or canopy around and against the receptacle and supporting and distending it by the contact of the rack thereunder, as shown in Fig. 2.

In operation the tank or kettle is first filled with water and then the gooseneck is screwed down thereinto, after which the medicinal preparations are placed in the bottom of the receptacle and the cover of the receptacle is screwed down into place, when the steamer is ready for use. As soon as the steam is generated in the kettle it forces its way through the gooseneck and enters the receptacle, where it is thoroughly medicated by contact with the preparations contained therein and from the receptacle is discharged through the discharge-pipe into the rose, by which it is distributed over the face or other portion of the body to be treated. While using the steamer the head and shoulders are entirely covered by the screen or canopy, so as to prevent the escape of the steam, and the canopy is so distended by the rack that it does not readily become soaked and heavy by the action of the steam thereon, and, moreover, is held away from the face of the person taking the treatment, thereby greatly facilitating the operation. The clasping-fingers, which are fixedly attached to and carried by the supporting-tube, serve a triple function in that they serve to hold the canopy into close contact with the receptacle, thereby preventing the escape of steam before contacting with the face of the person being treated, and they also serve to hold the rose firmly in operative relation to the steam-discharge pipe, and finally the supporting-fingers serve to prevent the lateral turning or movement of the screen or canopy supporting rack and serve to hold the same in its operative position despite the weight of the canopy thereon. It will thus be seen that the device is simple in construction and operation and that it is so arranged that a few parts are enabled to perform all the functions necessary in the operation for which the device is intended.

What I regard as new, and desire to secure by Letters Patent, is—

1. In a device of the class described, the combination of a kettle or tank, a conveying-pipe therefrom, a receptacle for a medicinal compound with which the conveying-pipe is connected, a discharge-pipe leading from the receptacle, and a distending-rack mounted on the discharge-pipe terminating in clasping-fingers adapted to encircle the receptacle and hold the rack in upright relation to the discharge-pipe, substantially as described.

2. In a device of the class described, the combination of a kettle or tank, a steam-conveying pipe leading therefrom, a receptacle for a medicinal compound connected with the conveying-pipe, a steam-discharge pipe leading from the receptacle, a carrying-tube slidably mounted on the discharge-pipe, a rose on the end of the carrying-tube, a distending rack mounted on and carried by the carrying-tube and a spring-clasp for holding the distending-rack in upright relation to the carrying-tube and holding the carrying-tube in position on the discharge-pipe, substantially as described.

3. In a device of the class described, the combination of a tank or kettle, a conveying-pipe leading from the tank or kettle, a receptacle for a medicinal compound carried by the conveying-pipe, a discharge-pipe leading from the receptacle, a supporting-tube slidably mounted on the discharge-pipe, a distending-rack fixedly attached to and carried by the supporting-tube and clasping-fingers fixedly attached to the supporting-tube and adapted to encircle the receptacle under pressure and hold the distending-rack in upright relation to the carrying-tube and to hold the carrying-tube on the discharge-pipe, substantially as described.

4. In a device of the class described, the combination of a tank or kettle, a receptacle connected with the tank or kettle, a steam-discharge pipe leading from the tank or kettle, a supporting-tube slidably mounted on the steam-discharge pipe, a rose provided with an inlet-mouth fixedly attached to the inner wall of the carrying-tube and forming an abutment for the outer end of the steam-discharge pipe, a distending-rack having diverging side arms and a cross-bar connecting the side arms, clasping-fingers connected with the arms of the distending-rack for holding the rack in upright relation to the supporting-tube and the supporting-tube in upright position on the steam-discharge pipe and a ring or collar surrounding the carrying-tube and the ends of the supporting-rack carried thereby, substantially as described.

5. In a device of the class described, the combination of a tank or kettle, a receptacle connected therewith, a steam-discharge pipe leading from the receptacle, a carrying-tube slidably mounted on the steam-discharge pipe, a rose on the end of the carrying-tube, a distending-rack fixedly attached to the carrying-tube and a screen or canopy having its edge held between the wall of the receptacle and the clasping-fingers encircling the receptacle and having its body distended by the distending-rack, substantially as described.

CORA A. BUTLER.

Witnesses:
SAMUEL W. BANNING,
THOMAS A. BANNING.